United States Patent
Kruglikov et al.

(10) Patent No.: US 11,343,298 B2
(45) Date of Patent: May 24, 2022

(54) VIDEO STREAM MANAGEMENT FOR REMOTE GRAPHICAL USER INTERFACES

(71) Applicant: VMware, Inc., Palo Alto, CA (US)

(72) Inventors: Alexei Kruglikov, Fremont, CA (US); Dustin Michael Byford, Pacifica, CA (US)

(73) Assignee: VMware, Inc., Palo Alto, CA (US)

( * ) Notice: Subject to any disclaimer, the term of this patent is extended or adjusted under 35 U.S.C. 154(b) by 92 days.

(21) Appl. No.: 16/251,870

(22) Filed: Jan. 18, 2019

(65) Prior Publication Data

US 2019/0158559 A1  May 23, 2019

Related U.S. Application Data

(63) Continuation of application No. 15/167,946, filed on May 27, 2016, now Pat. No. 10,187,442, which is a continuation of application No. 13/666,077, filed on Nov. 1, 2012, now Pat. No. 9,372,737.

(60) Provisional application No. 61/596,561, filed on Feb. 8, 2012.

(51) Int. Cl.
| | |
|---|---|
| *H04L 65/60* | (2022.01) |
| *G06F 9/54* | (2006.01) |
| *H04L 41/22* | (2022.01) |
| *H04L 67/01* | (2022.01) |

(52) U.S. Cl.
CPC .............. *H04L 65/607* (2013.01); *G06F 9/54* (2013.01); *H04L 41/22* (2013.01); *H04L 67/42* (2013.01); *G06F 2209/549* (2013.01)

(58) Field of Classification Search
CPC ....... H04L 65/607; H04L 41/22; H04L 67/42; G06F 9/54; G06F 2209/549

USPC ......................................................... 709/203
See application file for complete search history.

(56) References Cited

U.S. PATENT DOCUMENTS

| | | | |
|---|---|---|---|
| 7,509,267 | B1 | 3/2009 | Yarmolich et al. |
| 9,372,737 | B2 | 6/2016 | Kruglikov et al. |
| 10,187,442 | B2 | 1/2019 | Kruglikov et al. |
| 2003/0115598 | A1 | 6/2003 | Pantoja |
| 2003/0135863 | A1 | 7/2003 | Van Der Schaar |

(Continued)

OTHER PUBLICATIONS

Citrix, "Troubleshooting the HDX Media Stream (SpeedScreen Multimedia Acceleration) Feature," 5 pagers, Jul. 21, 2010, available at http://support.citrix.com/article/CTX104912?print.

(Continued)

*Primary Examiner* — Tan Doan
(74) *Attorney, Agent, or Firm* — Fish & Richardson P.C.

(57) ABSTRACT

Embodiments enable display updates other than a video stream in a graphical user interface (GUI) to be rendered, encoded, and transmitted exclusive of the video stream. A virtual machine generates a GUI that includes an encoded video stream and other display updates. A virtual graphics processing unit (VGPU) stack associated with the VM renders the other display updates of the GUI to a framebuffer. The rendered display updates are encoded and transmitted to a client for display. The encoded video stream, or a modified (e.g., reduced bit rate) version of the encoded video stream, may be transmitted to the client, such that the client can display the encoded video stream within the GUI. For example, the encoded video stream may be selectively transmitted to the client based on the performance capabilities of the client.

18 Claims, 2 Drawing Sheets

(56) References Cited

U.S. PATENT DOCUMENTS

| | | | |
|---|---|---|---|
| 2006/0069797 A1* | 3/2006 | Abdo | H04L 29/06027 709/231 |
| 2006/0282855 A1 | 12/2006 | Margulis | |
| 2009/0231415 A1* | 9/2009 | Moore | H04N 21/2662 348/E7.083 |
| 2009/0303156 A1* | 12/2009 | Ghosh | H04N 19/48 345/1.2 |
| 2010/0077058 A1 | 3/2010 | Messer | |
| 2010/0226548 A1* | 9/2010 | Abdo | H04N 19/136 382/128 |
| 2010/0271381 A1* | 10/2010 | Byford | G06F 3/1415 345/547 |
| 2013/0298170 A1* | 11/2013 | ElArabawy | H04L 47/30 725/62 |

OTHER PUBLICATIONS

Microsoft, "Remote Desktop Protocol," 3 pages, 2011, available at http://msdn.microsoft.com/en-us/library/windows/desktop/aa383015.

Teradici, "APEX 2800 PCoIP Server Offload Card," 2 pages, 2012 available at http://www.teradici.com/pcoip/pcoip-products/procip-server-offload.

* cited by examiner

VIDEO STREAM MANAGEMENT FOR REMOTE GRAPHICAL USER INTERFACES

CROSS REFERENCE TO RELATED APPLICATION

This application is a continuation application of U.S. patent application Ser. No. 15/167,946, filed on May 27, 2016, which is a continuation application of U.S. patent application Ser. No. 13/666,077, filed Nov. 1, 2012, now U.S. Pat. No. 9,372,737, which claims the benefit of U.S. Provisional Patent Application No. 61/596,561 filed Feb. 8, 2012, all of which are incorporated herein in its entirety.

BACKGROUND

Remote desktop technology allows a user of a client computing device to interact with a graphical user interface (e.g., a desktop interface) that is managed by a server computing device. The graphical user interface (GUI) includes display information to be presented on a display for a user. For example, display updates generated by software applications executed by the server may be rendered to a framebuffer at the server and then transmitted to the client for display. The framebuffer stores pixel color values for every pixel for an output display. Remote desktop and computing applications export the GUI to a remote device, referred to herein as the "client device." Conversely, user inputs (e.g., mouse clicks and keystrokes) at the client device may be transmitted to the server for input into applications or other software running at the server.

To limit the amount of data transferred between the server and client, the GUI may be encoded. For example, the server may compress every frame and/or calculate differences between a current rendering (e.g., frame) of the desktop interface and a previous rendering, and transmit the differences to the client, rather than transmitting the entirety of the desktop interface.

Further, the desktop interface may be "virtual," generated by a virtual machine (VM) executed by the server. In such virtual desktop infrastructures (VDIs), the GUI may be rendered by a virtual graphics processing unit (VGPU) stack associated with the VM, encoded, and transmitted to the client for display. When a video stream provided in encoded form is to be displayed within the desktop interface, the VGPU decodes the encoded video stream and renders the decoded video stream within the desktop interface. The desktop interface, including the decoded video stream, is then encoded and transmitted to the client.

SUMMARY

The methods and systems described herein enable display updates other than a video stream in a graphical user interface (GUI), such as a virtual desktop, to be transmitted to a client exclusive of the video stream. In exemplary embodiments, a VM executed by a server generates a GUI that includes an encoded video stream and other display updates. A virtual graphics processing unit (VGPU) stack associated with the VM renders the other display updates of the GUI to a framebuffer without decoding or rendering the video stream to the framebuffer. The server encodes the rendered display updates and transmits the encoded display updates to a client for display. In some embodiments, the encoded video stream, or a modified (e.g., reduced bit rate) version of the encoded video stream, is transmitted to the client using a communication channel other than the communication channel used to transmit the encoded GUI, such that the client can decode and display the encoded video stream within the GUI.

DETAILED DESCRIPTION

Embodiments described herein facilitate reducing server computing load in a virtual desktop infrastructure (VDI) by rendering display updates to a graphical user interface (GUI) other than a video stream, and encoding and transmitting the rendered display updates, exclusive of the video stream, to a client. Accordingly, the encoded video stream need not be decoded and rendered within the GUI by the server, potentially reducing the volume (e.g., the quantity and/or the size) of display updates that are encoded and transmitted to the client. As a result, the utilization of processor and/or network resources used to encode and transmit such display updates may also be reduced.

In some embodiments, the encoded video stream is discarded by the server. In other embodiments, the server transmits the encoded video stream to the client separately from other display updates in the GUI or modifies (e.g., reduces the bit rate of) the encoded video stream and transmits the modified version of the encoded video stream to the client separately from other display updates in the GUI. For example, the server may determine the performance capabilities (e.g., network bandwidth or a hardware attribute) of the client and determine whether to prevent transmission of the encoded video stream, transmit the original encoded video stream, or transmit a modified version of the encoded video stream based on the performance capabilities.

Figure 1:
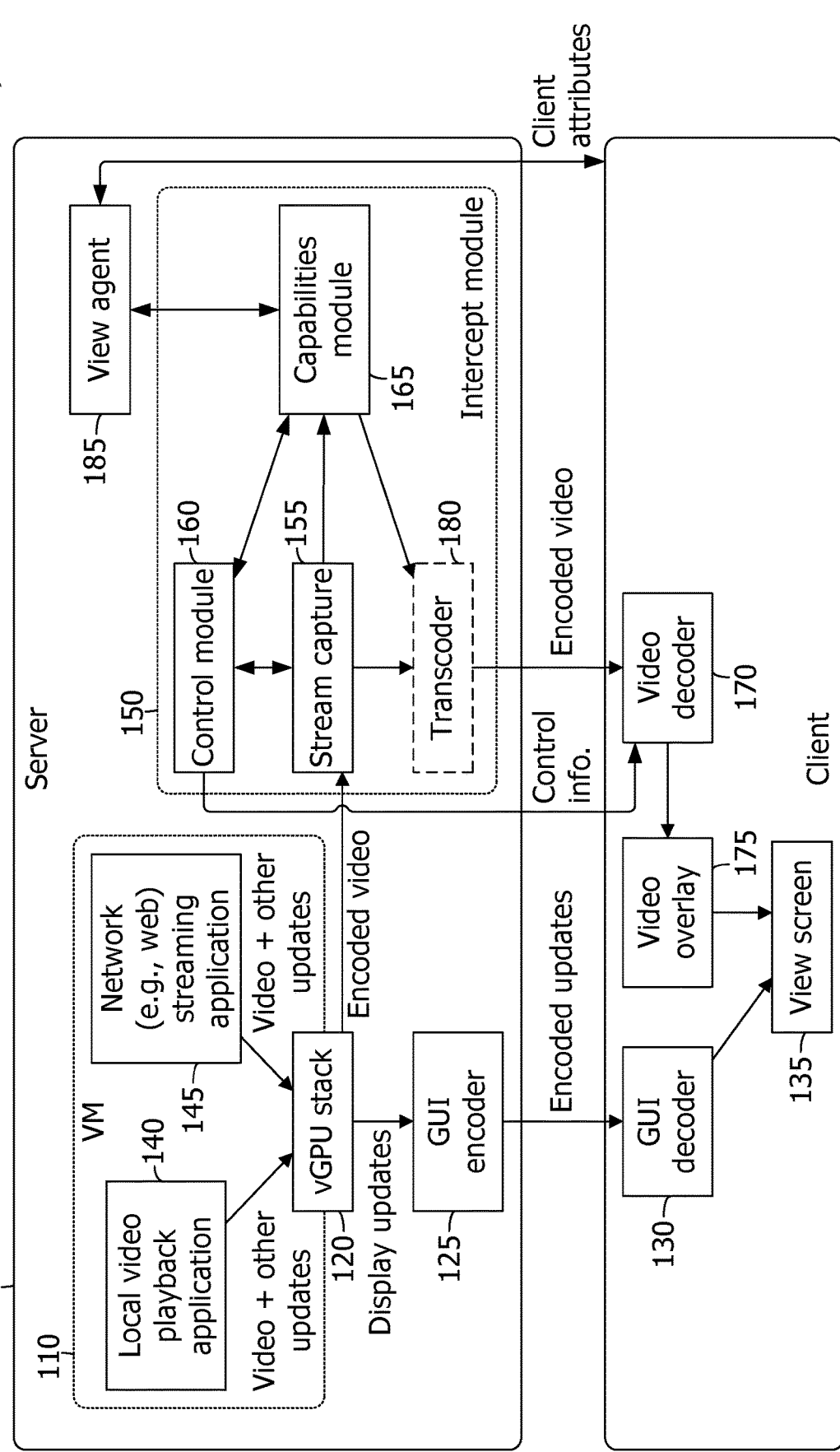
FIG. 1 is a block diagram of a system for providing access to a graphical user interface.

FIG. 1 is a block diagram of an exemplary system 100 for providing remote access to a GUI, such as a virtual desktop interface. In exemplary embodiments, a server computing device 105 ("server") executes a virtual machine (VM) 110 that generates a GUI for display at a client computing device 115 ("client"). For example, the GUI may include a desktop interface produced by a guest operating system executed within VM 110. In addition, or alternatively, the GUI may include graphical elements (e.g., a window) produced by a software application executed by such a guest OS.

In exemplary embodiments, VM 110 generates the GUI by instructing a virtual graphics processing unit (VGPU) stack 120 that is associated with VM 110 to draw and display graphical elements, such as windows, fields, icons, images, and input controls (e.g., buttons), of the GUI. The instructions to the VGPU may be referred to as "display updates." VGPU stack 120 includes, for example, a graphics driver (not shown), which may be included in VM 110, a software-emulated or "virtual" graphics device (not shown), such as a virtual graphics adapter, and a virtual display device (not shown), such as a virtual monitor (e.g., liquid crystal display). Software applications executed by VM 110 interact with the graphics driver of VGPU stack 120, either directly or via the guest OS. The virtual graphics device interacts with guest software executing in the VM as would a physical graphics device.

VGPU stack 120 renders the display updates in the GUI as instructed by VM 110. In exemplary embodiments, VGPU stack 120 renders the display updates by drawing a frame of pixels depicting the graphical elements to one or more framebuffers (not shown) provided by the virtual graphics device (not shown). Successive frames may be drawn by updating the framebuffer(s), such as by drawing successive frames to alternating framebuffers, or "multiple buffering."

A GUI encoder 125 encodes the rendered display updates and transmits the encoded display updates to client 115. The display updates may be encoded, for example, by applying a lossless or lossy data compression algorithm to a drawn frame, or to modified pixel values within the frame, and/or by applying video compression to a sequence of frames drawn by VGPU stack 120. Video compression may include interframe compression, such as encoding a given frame as a set of differences between that frame and a previous frame.

Client 115 receives the encoded display updates and decodes the encoded display updates using a GUI decoder 130. The decoded display updates are displayed at a view screen 135 of client 115 to update the GUI as instructed by VM 110, such as by rendering the decoded display updates to a framebuffer of a physical graphics device that is connected to a physical display device.

In some scenarios, a video stream is displayed within the GUI. For example, a user of client 115 may access a video stored at server 105 using a local video playback application 140, or may access a video hosted on a network (e.g., the World Wide Web) using a network streaming application 145, both of which are executed at server 105 by VM 110. Such videos are typically provided in the form of an encoded video stream, which enables the video to be compressed using a video-specific compression algorithm (e.g., including interframe compression). For example, a video stream may be compressed using the H.264 standard for video compression. Accordingly, displaying the video stream using the process described above may involve decoding the encoded video stream, generating display updates based on the video stream, and rendering the display updates to the framebuffer using VGPU stack 120. Such an implementation would trigger a display update in the GUI each time successive frames of the video stream differ, even if nothing within the GUI other than the video stream was modified. As a result, GUI encoder 125 would encode and transmit the display update for each such change, essentially re-encoding the video stream. In addition to imposing a computing load on server 105, such an implementation may provide a video stream that client 115 is incapable of displaying at an acceptable quality level (e.g., frame rate) due to performance limitations of client 115.

Figure 2:
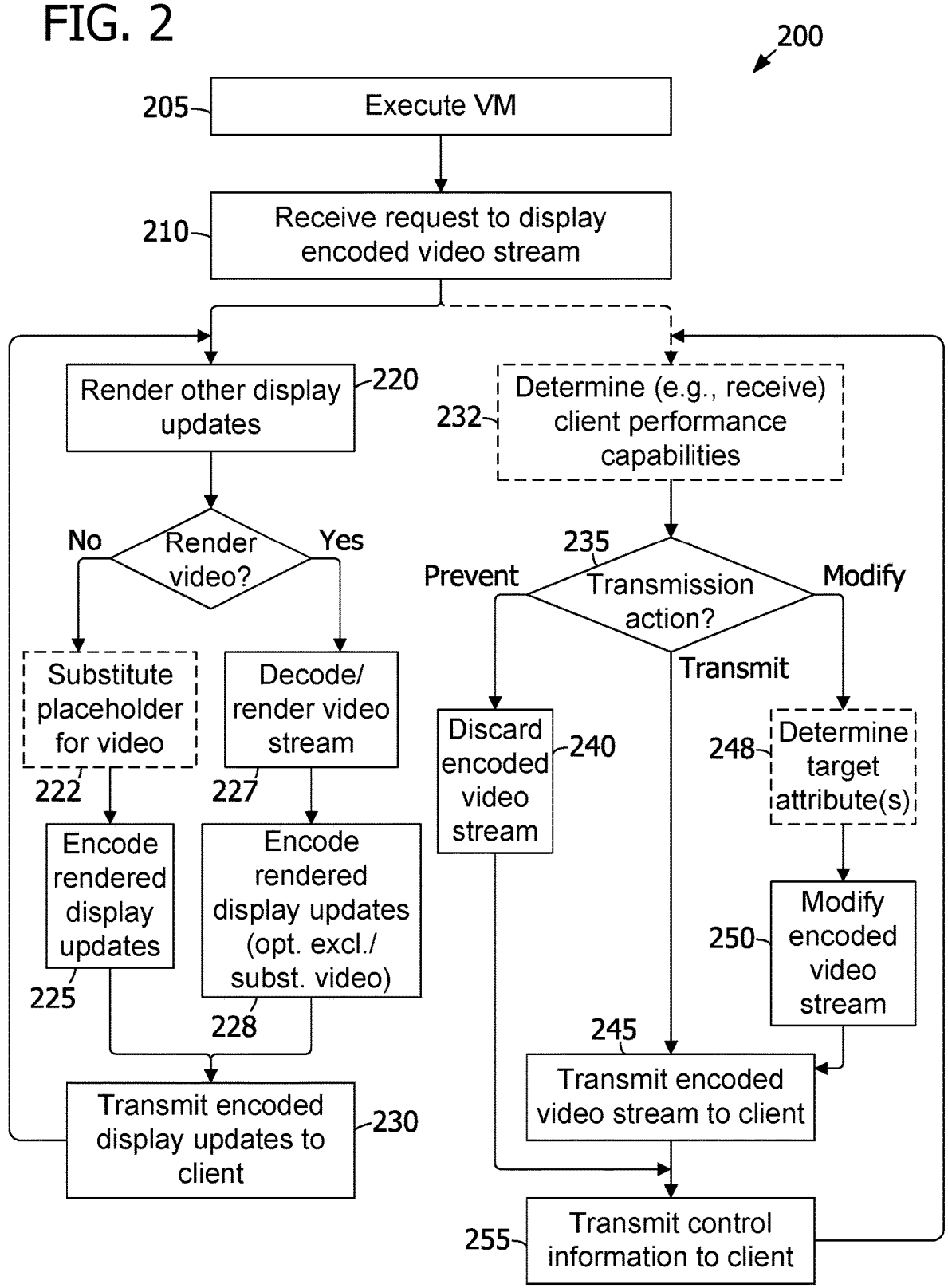
FIG. 2 is a flowchart of an exemplary method for providing access to a graphical user interface using the system shown in FIG. 1.

FIG. 2 is a flowchart of an exemplary method 200 for providing access to a GUI using system 100 (shown in FIG. 1). Referring to FIGS. 1 and 2, as described above, server 105 executes 205 VM 110. As VM 110 executes, VGPU stack 120 receives 210 a request to display a video stream (e.g., from local video playback application 140 or network streaming application 145) within the GUI. The video stream is provided (e.g., stored locally or streamed from another computing device) in encoded form.

VGPU stack 120 renders 220 display updates in the GUI other than the video stream to the framebuffer. VGPU stack 120 may or may not render the video stream, depending on a configuration of server 105 and/or a configuration provided by client 115, such as a configuration parameter indicating that client 115 supports "video redirection" (e.g., receiving the encoded video stream in a communication channel separate from that used to transmit 230 other display updates).

When the configuration specifies that the video stream should not be rendered by VGPU stack 120, VGPU stack 120 keeps the encoded video stream separate from other display updates in the GUI. For example, VGPU stack 120 may substitute 222 a placeholder for the encoded video stream within the GUI. In some embodiments, VGPU stack 120 substitutes 222 a placeholder for the video stream by rendering the area of the GUI occupied by the video stream as a solid color and/or as a textual message or image indicating that the encoded video stream has been suppressed. GUI encoder 125 encodes 225 the rendered display updates, which exclude the video stream, and transmits 230 the encoded display updates to client 115, as described above with reference to FIG. 1.

When the configuration specifies that the video stream should be rendered by VGPU stack 120, VGPU stack 120 decodes and renders 227 the video stream to the framebuffer with the other display updates. GUI encoder 125 encodes 228 the rendered display updates, including the video stream. Optionally, GUI encoder 125 may exclude the video stream and/or substitute a placeholder for the video stream, as described above, when encoding 228 the rendered display updates. For example, GUI encoder 125 may determine whether to encode the video stream based on a configuration parameter provided by client 115. Performing such exclusion and/or substitution at GUI encoder 125 enables system 100 to accommodate scenarios in which video redirection capabilities change during the computing session in which the GUI is presented. For example, if client 115 becomes unable to support video redirection due to a malfunction, client 115 may request that GUI encoder 125 include the video stream when encoding 228 display updates. Similarly, if the computing session is disconnected from a first client that supports video redirection and reconnected to a second client that does not support video redirection, the second client may request that GUI encoder 125 include the video stream when encoding 228 display updates. In response to such a request, GUI encoder 125 encodes 228 the video stream along with the other display updates and transmits 230 the encoded display updates to client 115.

In exemplary embodiments, rendering 220 and encoding 225 display updates other than the video stream for transmission 230 to client 115 avoids decoding of the video stream by VGPU stack 120 and re-encoding of the decoded video stream as display updates within the GUI by GUI encoder 125. Accordingly, the utilization of computing resources (e.g., processor cycles and/or network bandwidth) associated with providing the GUI to client 115 may be significantly reduced. Such a computing resource utilization reduction may be especially pronounced where server 105 provides GUIs to a plurality of clients 115. In some embodiments, VGPU stack 120 decodes and renders 227 the video stream to the framebuffer, but GUI encoder 125 excludes the video stream when encoding 228 display updates. Such embodiments incur some computing resource (e.g., processor cycles) utilization due to the decoding and rendering 227 but still exhibit reduced computing resource (e.g., processor cycles and network bandwidth) utilization by avoiding encoding and transmission of display updates based on the video stream.

Further, where client 115 is a device with limited computing resources, such as a smart phone or a device with limited network bandwidth, the encoded video stream may not be displayable at client 115 at an acceptable level of quality. For example, client device 115 may display only a portion of the frames in the video stream (also known as "dropping" frames), potentially causing the video stream to be unintelligible. In such scenarios, omitting the encoded video stream from display updates transmitted 230 to client 115 may not negatively affect the computing experience of a user at client 115.

Exemplary embodiments omit decoding and rendering 227 of the video stream using VGPU stack 120, at the level of a graphics driver or a virtual device. For example, VGPU stack 120 may, when queried for capabilities by the guest OS of VM 110, advertise hardware acceleration of one or more video decoding operations (e.g., motion compensation, de-interlacing, decryption, post-processing, and/or supported encodings). Accordingly, software applications, such as local video playback application 140 and network streaming application 145, may delegate decoding and rendering of an encoded video stream to VGPU stack 120 using a standard, general-purpose interface that supports hardware acceleration, such as DirectX Video Acceleration (DXVA), provided by Microsoft Windows™. Accordingly, the video stream may be decoded and rendered 227, or omitted, as determined by VGPU stack 120. Such embodiments enable server 105 to accommodate video streams provided by any software application, rather than accommodating only applications that use a specialized application programming interface (API).

In some embodiments, the encoded video stream is not provided to client 115. In other embodiments, the encoded video stream is optionally transmitted to client 115. In such embodiments, an intercept module 150 executed by server 105 captures the encoded video stream from VGPU stack 120 using a stream capture component 155. A control module 160 of intercept module 150 selects 235 one of three available transmission actions: a) preventing transmission of the encoded video stream, b) transmitting the encoded video stream, and c) transmitting a modified version of the encoded video stream.

As one example, control module 160 may be configured to always select 235 a predetermined transmission action. As another example, intercept module 150 may be configured to select 235 a transmission action based on a preference or configuration associated with VM 110, with client 115, and/or with the user of client 115. In addition, or alternatively, control module 160 may select 235 a transmission action based on client performance capabilities (e.g., provided by a capabilities module 165), as described in more detail below.

Intercept module 150 performs the selected transmission action. When prevention of transmission is selected 235, intercept module 150 discards 240 the encoded video stream, such that the encoded video stream is not transmitted to client 115. When transmission of the encoded video stream is selected 235, intercept module 150 transmits 245 the original encoded video stream, as received from VGPU stack 120, to client 115. In exemplary embodiments, GUI encoder 125 transmits 230 the encoded display updates to client 115 using a first communication channel (e.g., a first network socket), and intercept module 150 transmits 245 the encoded video stream to client 115 using a second communication channel (e.g., a second network socket).

Client 115 receives the encoded video stream and decodes the encoded video stream using a video decoder 170. Video decoder 170 may include a hardware decoder and/or a software decoder executed by a processor of client 115. For example, some examples of client 115, such as a netbook, may not include a hardware decoder. Other examples of client 115, such as a desktop computer, may include a hardware decoder (e.g., a graphics processing unit, GPU) capable of performing at least some video decoding hardware acceleration. Whether implemented as hardware, software, or both, video decoder 170 decodes the encoded video stream, and client 115 renders the decoded video stream within the GUI using a video overlay component 175, such that the decoded video stream is displayed within the GUI to the user of client 115.

When transmission of a modified version of the encoded video stream is selected 235, prior to transmitting 245 the video stream, intercept module 150 modifies 250 the encoded video stream using a transcoder 180. In exemplary embodiments, transcoder 180 modifies the encoded video stream's encoding, bit rate, frame rate, and/or resolution. For example, transcoder 180 may reduce the bit rate of the encoded video stream by decoding the video stream and re-encoding the decoded video stream using a video compression algorithm that achieves a higher compression ratio than that achieved by the compression algorithm used to encode the original encoded video stream, and/or using video compression parameters that allow a greater amount of data loss than allowed by the parameters used to encode the original encoded video stream. As another example, transcoder 180 may decode the video stream, scale the decoded video stream to a lower resolution than the resolution of the original encoded video stream, and encode the scaled video stream. Such modification 250 enables server 105 to reduce the network bandwidth used to transmit 245 the encoded video stream to client 115, and/or to reduce the computing load incurred by client 115 in decoding the encoded video stream.

In exemplary embodiments, control module 160 also transmits 255 control information associated with the video stream and/or with the GUI to client 115. The control information includes video stream attributes (e.g., the video compression format, the resolution, the frame rate, and/or the bit rate of the video stream), one or more dimensions (e.g., the width and/or height) of the video stream, the position (e.g., an x-coordinate, a y-coordinate, and/or a z-coordinate) of the video stream within the GUI, and/or compositing information associated with the video stream and the GUI (e.g., which graphical elements, if any, underlay or overlay the video stream in the GUI). Video overlay component 175 of client 115 renders the decoded video stream within the GUI based on the control information. For example, if other graphical elements in the GUI overlap the video stream, video overlay component 175 may overlay the video stream on the graphical elements that are positioned below the video stream (e.g., elements having a lower z-coordinate than that of the video stream) and overlay the graphical elements that are positioned above the video stream (e.g., elements having a higher z-coordinate than that of the video stream) on the video stream. Accordingly, aside from any modification 250 performed by transcoder 180, the video stream is displayed in view screen 135 of client 115 as the video stream would be displayed to a local user at server 105, but without incurring the computing resource utilization of decoding the video stream and re-encoding the video stream within the GUI at server 105.

As described above, in some embodiments, VGPU stack 120 and/or GUI encoder 125 provides a message and/or an image indicating that the video stream has been suppressed. When the encoded video stream is transmitted 245 to client 115, video overlay component 175 may overlay the video stream on such an indication, whereas when the encoded video stream is discarded 240, the indication is shown. In other embodiments, no such indication is provided by server 105, and when server 105 discards 240 the encoded video stream, video overlay component 175 renders a message or image indicating the suppression of the video stream at the position (e.g., as indicated by the control information) of the video stream within the GUI. For example, video overlay component may display a message such as "Video stream suppressed at remote desktop."

As described above, control module 160 may select 235 a transmission action based on a configuration of control module 160, VM 110, client 115, and/or the user of client 115. In some embodiments, the transmission action is selected 235 based on one or more performance capabilities of client 115. In such embodiments, capabilities module 165 determines 232 client performance capabilities, such as a network bandwidth of client 115, a hardware attribute of client 115 (e.g., processor speed, amount of memory, and/or presence of a hardware video decoder 170), hardware acceleration of one or more video decoding operations (e.g., motion compensation, de-interlacing, decryption, post-processing, and/or supported encodings), a resolution of client 115, and/or a frame rate of video displayed at client 115. For example, the client performance capabilities may be stored as a profile associated with client 115 and may be manually or automatically defined.

In some embodiments, capabilities module 165 determines 232 client performance capabilities at least in part by receiving the capabilities from client 115. In the embodiment shown in FIG. 1, capabilities module 165 receives the client performance capabilities via a view agent 185 that communicates with client 115. For example, view agent 185 may operate as a proxy for client 115, such that capabilities module 165 can request and receive capabilities of client 115 from view agent 185, which relays requests and responses between capabilities module 165 and client 115. In addition, or alternatively, client 115 may initiate a transmission of its performance capabilities to capabilities module 165, for example, when initializing a remote desktop session with server 105.

Control module 160 receives the performance capabilities from capabilities module 165 and selects 235 a transmission option based on the performance capabilities. As an example, control module 160 may select 235 preventing transmission of the encoded video stream, or modifying the encoded video stream (e.g., to reduce the bit rate), if client 115 does not include a hardware video decoder.

In exemplary embodiments, control module 160 selects 235 a transmission option by comparing a client performance capability to a predetermined threshold value. For example, if the network bandwidth of client 115 (e.g., the bandwidth from server 105 to client 115) is less than a minimum video streaming threshold value (e.g., 500 kilobits per second, kbps), control module 160 may select 235 preventing transmission of the encoded video stream, such that the video stream does not interfere with display of the GUI. If the network bandwidth is greater than the minimum video streaming threshold value and less than a moderate video streaming threshold value (e.g., 1000 kbps), control module 160 may select 235 modifying the encoded video stream to reduce the bit rate, such that the video stream may be transmitted to client 115 without interfering with the display of the GUI. If the network bandwidth is greater than the moderate video streamlining threshold value, control module 160 may select 235 transmitting the original encoded video stream.

Threshold values may be predetermined, as described above, or may be determined by control module 160 based on attributes of the encoded video stream. In an exemplary embodiment, control module 160 selects 235 the transmission option in part by calculating a minimum video streaming threshold value based on the bit rate of the encoded video stream received by stream capture component 155. For example, the threshold value may be equal to the sum of the bit rate of the encoded video stream, an estimated average bandwidth associated with transmitting 230 display updates in the GUI, and, optionally, a predetermined bandwidth overhead value representing an estimated amount of bandwidth used by client 115 for purposes other than displaying the GUI and/or representing an estimated amount by which the available bandwidth may fluctuate. In another embodiment, control module 160 calculates a desired resolution threshold value equal to the resolution of the encoded video stream received by stream capture component 155.

In some embodiments, control module 160 selects 235 the transmission option based on a plurality of performance capabilities. For example, a first set of threshold values (e.g., minimum processor speed) may be applied when client 115 includes a hardware video decoder 170, and a second set of threshold values may be applied when client 115 does not include a hardware video decoder 170.

In one embodiment, when control module 160 selects 235 modifying the video stream, transcoder 180 modifies 250 the encoded video stream based on a predetermined set of target attributes, such as a target bit rate, a target frame rate, a target resolution, and/or a target encoding. For example, whenever modification is selected 235, transcoder 180 may modify 250 the encoded video stream by decoding the encoded video stream and re-encoding the decoded video stream using a predetermined resolution and/or a predetermined bit rate expected to enable client 115 to decode and display the video stream.

In another embodiment, transcoder 180 modifies 250 the encoded video stream based on the performance capabilities of client 115, such as by determining 248 (e.g., calculating) one or more target attributes for the video stream based on the performance capabilities, and modifying 250 the encoded video stream using the determined target attributes. As one example, transcoder 180 may determine 248 a target encoding from a set of encodings supported by client 115 and re-encode the video stream using the target encoding. As another example, transcoder 180 may determine 248 a target resolution that is equal to the resolution of client 115 and modify 250 the encoded video stream by scaling the video stream such that the resolution of the transmitted video stream is less than or equal to the target resolution. As yet another example, transcoder 180 may reduce the bit rate of the video stream to a target bit rate that is based on the processor speed and/or bandwidth of client 115.

In some embodiments, transcoder 180 determines 248 a target attribute by evaluating a mathematical function (e.g., a stepwise or continuous function) using one or more client capabilities as input values. For example, such a function may provide a target bit rate that is positively correlated with the processor speed and/or the bandwidth of client 115.

Some performance capabilities, such as processor speed and the presence of a hardware video decoder 170, are static. Other performance capabilities, such as bandwidth and frame rate, may be dynamic. Accordingly, the process of determining 232 client performance capabilities and selecting 235 a transmission action may be performed repeatedly, such that control module 160 can adapt the transmission action as the client performance capabilities change over time. For example, if client 115 is a mobile device, the bandwidth of client 115 may change significantly as client 115 moves out of range a wireless local area network (WLAN) and begins communicating with server 105 using a mobile data (e.g., 3G or 4G) network. Similarly, client 115 may detect and report to capabilities module 165 (via view agent 185) the frame rate of encoded video stream as it is decoded and rendered to view screen 135. If the detected frame rate is less than the frame rate of the encoded video stream transmitted 245 to client 115, control module 160 may select 235 modifying the video stream to reduce the bit rate.

Exemplary Operating Environment

The operations described herein may be performed by a computer or computing device. A computer or computing device may include one or more processors or processing units, system memory, and some form of computer readable storage media. Computer-readable storage media are tangible and non-transitory and store information such as computer readable instructions, data structures, program modules, or other data. Exemplary computer readable storage media include hard disk drives, flash memory drives, digital versatile discs (DVDs), compact discs (CDs), and magnetic tape cassettes.

The operations illustrated and described herein may be implemented as computer-executable instructions encoded on a computer-readable medium, in hardware programmed or designed to perform the operations, or both. Aspects of the disclosure transform a general-purpose computer into a special-purpose computing device when programmed to execute the operations described herein.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for providing a graphical user interface (GUI) from a server computing device to a client device, the method comprising:
    executing, by the server computing device, a virtual machine (VM) that generates GUI elements of the GUI associated with the VM for display on a client device;
    receiving a request to display a video stream within the GUI;
    determining whether to render the video stream before sending to the client device based on one or more configuration parameters provided by the client device to the server computing device including a configuration parameter indicating whether the client device supports video redirection;
    in response to determining not to render the video stream before sending to the client device based on the one or more configuration parameters including the configuration parameter indicating whether the client device supports video redirection:
        rendering, on the server, display elements of the GUI other than the requested video stream and transmitting the rendered display elements to the client device for display using a first communication channel; and
        separately transmitting, using a second communication channel, the video stream to the client device, wherein the video stream is configured for decoding by the client device and rendering within the GUI presented on the client device, and wherein a particular transmission bit rate is selected for the video stream based on a hardware performance capability of the client device and attributes of the video stream.

2. The method of claim 1, wherein the display elements are transmitted to the client device in a first communication channel and the encoded video stream is transmitted separately from the rendered display elements using a second communication channel.

3. The method of claim 1, further comprising:
    transmitting control information associated with the video stream to the client device, wherein the control information comprises video stream attributes and positioning information of the video stream in the GUI.

4. The method of claim 1, further comprising:
    determining, by the server, a performance capability of the client device;
    comparing the determined performance capability of the client device with one or more predetermined threshold values; and
    in response to the performance capability satisfying one or more of the threshold values, modifying the video stream based on the determined performance capabilities prior to transmitting the video stream to the client device.

5. The method of claim 1, wherein the rendered GUI display elements are encoded prior to transmission, the encoding including applying compressing the display elements.

6. The method of claim 1, wherein a virtual graphics processing unit (VGPU) stack renders the display elements of the GUI while keeping the video stream separate from the display elements.

7. A system comprising:
    a server computing device including one or more processors and one or more storage devices having computer-executable components including instructions that when executed perform operations comprising:
        executing, by the server computing device, a virtual machine (VM) that generates GUI elements of the GUI associated with the VM for display on a client device;
        receiving a request to display a video stream within the GUI;
        determining whether to render the video stream before sending to the client device based on one or more configuration parameters provided by the client device to the server computing device including a configuration parameter indicating whether the client device supports video redirection;

in response to determining not to render the video stream before sending to the client device based on the one or more configuration parameters including the configuration parameter indicating whether the client device supports video redirection:

rendering, on the server, display elements of the GUI other than the requested video stream and transmitting the rendered display elements to the client device for display using a first communication channel; and separately transmitting, using a second communication channel, the video stream to the client device, wherein the video stream is configured for decoding by the client device and rendering within the GUI presented on the client device, and wherein a particular transmission bit rate is selected for the video stream based on a hardware performance capability of the client device and attributes of the video stream.

8. The system of claim 7, wherein the display elements are transmitted to the client device in a first communication channel and the encoded video stream is transmitted separately from the rendered display elements using a second communication channel.

9. The system of claim 7, further including instructions that when executed perform operations comprising:
transmitting control information associated with the video stream to the client device, wherein the control information comprises video stream attributes and positioning information of the video stream in the GUI.

10. The system of claim 7, further including instructions that when executed perform operations comprising:
determining, by the server, a performance capability of the client device; and
comparing the determined performance capability of the client device with one or more predetermined threshold values; and
in response to the performance capability satisfying one or more of the threshold values, modifying the video stream based on the determined performance capabilities prior to transmitting the video stream to the client device.

11. The system of claim 7, wherein the rendered GUI display elements are encoded prior to transmission, the encoding including applying compressing the display elements.

12. The system of claim 7, wherein a virtual graphics processing unit (VGPU) stack renders the display elements of the GUI while keeping the video stream separate from the display elements.

13. One or more non-transitory computer-readable storage media having computer-executable components including instructions that when executed perform operations comprising:
executing, by a server computing device, a virtual machine (VM) that generates GUI elements of the GUI associated with the VM for display on a client device;
receiving a request to display a video stream within the GUI;

determining whether to render the video stream before sending to the client device based on one or more configuration parameter provided by the client device to the server computing device including a configuration parameter indicating whether the client device supports video redirection;

in response to determining not to render the video stream before sending to the client device based on the one or more configuration parameters including the configuration parameter indicating whether the client device supports video redirection:

rendering, on the server, display elements of the GUI other than the requested video stream and transmitting the rendered display elements to the client device for display using a first communication channel; and separately transmitting, using a second communication channel, the video stream to the client device, wherein the video stream is configured for decoding by the client device and rendering within the GUI presented on the client device, and wherein a particular transmission bit rate is selected for the video stream based on a hardware performance capability of the client device and attributes of the video stream.

14. The non-transitory computer-readable storage media of claim 13, wherein the display elements are transmitted to the client device in a first communication channel and the encoded video stream is transmitted separately from the rendered display elements using a second communication channel.

15. The non-transitory computer-readable storage media of claim 13, further comprising instructions that when executed perform operations comprising:
transmitting control information associated with the video stream to the client device, wherein the control information comprises video stream attributes and positioning information of the video stream in the GUI.

16. The non-transitory computer-readable storage media of claim 13, further comprising instructions that when executed perform operations comprising:
determining, by the server, a performance capability of the client device; and
comparing the determined performance capability of the client device with one or more predetermined threshold values; and
in response to the performance capability satisfying one or more of the threshold values, modifying the video stream based on the determined performance capabilities prior to transmitting the video stream to the client device.

17. The non-transitory computer-readable storage media of claim 13, wherein the rendered GUI display elements are encoded prior to transmission, the encoding including applying compressing the display elements.

18. The non-transitory computer-readable storage media of claim 13, wherein a virtual graphics processing unit (VGPU) stack renders the display elements of the GUI while keeping the video stream separate from the display elements.

* * * * *